(12) United States Patent
Dorner

(10) Patent No.: US 7,103,498 B2
(45) Date of Patent: Sep. 5, 2006

(54) METHOD FOR DETERMINING THE ANGULAR POSITION OF A ROTOR

(75) Inventor: Thomas Dorner, Nuremberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 32 days.

(21) Appl. No.: 10/494,534

(22) PCT Filed: Oct. 9, 2002

(86) PCT No.: PCT/EP02/11284

§ 371 (c)(1),
(2), (4) Date: Apr. 30, 2004

(87) PCT Pub. No.: WO03/041261

PCT Pub. Date: May 15, 2003

(65) Prior Publication Data

US 2005/0001580 A1 Jan. 6, 2005

(30) Foreign Application Priority Data

Nov. 7, 2001 (DE) ................................. 101 54 564

(51) Int. Cl.
*G01C 19/00* (2006.01)
*H02P 6/00* (2006.01)
(52) U.S. Cl. ..................... 702/151; 702/150; 318/721; 318/823
(58) Field of Classification Search ................. 702/151
See application file for complete search history.

(56) References Cited

U.S. PATENT DOCUMENTS

| 4,843,580 A | * | 6/1989 | Ridoux et al. ............... 702/79 |
| 5,023,527 A | | 6/1991 | Erdman et al. |
| 5,969,491 A | * | 10/1999 | Viti et al. .................... 318/254 |
| 6,046,554 A | * | 4/2000 | Becerra ....................... 318/254 |

FOREIGN PATENT DOCUMENTS

| EP | 0647014 | 4/1995 |
| JP | 09009676 | 1/1997 |
| JP | 11146685 | 5/1999 |
| JP | 2001008489 | 1/2001 |

* cited by examiner

Primary Examiner—Bryan Bui
Assistant Examiner—Jonathan Moffat
(74) Attorney, Agent, or Firm—W. F. Fasse; W. G. Fasse

(57) ABSTRACT

According to the invention, in a method for determining the angular position of a rotor, a reference voltage is set in a calibration phase, such that when the rotor, rotating at a calibration speed, passes through a particular detection position, said voltage is the same as the electromotive force induced in the one winding coil. In a subsequent measuring phase the reference voltage is updated to a value ($U_R$) which is equal to the product of the voltage value set in the calibration phase and the ratio of the instantaneous motor rotational speed to the calibration rotational speed. The angular position of the rotor ($\omega_1$) at which the electromotive force corresponds to the updated reference voltage is thus identified as the detection position.

5 Claims, 4 Drawing Sheets

METHOD FOR DETERMINING THE ANGULAR POSITION OF A ROTOR

FIELD OF THE INVENTION

The invention relates to a method for determining the angular position of a rotor of an electronically commutated electric motor.

BACKGROUND INFORMATION

Such a method is, for example known from EP 647,014 B1. The known method serves for ascertaining the angular position of the rotor of a brushless motor. Brushless motors are electronically commutated motors. The winding coils of these motors are energized in a cyclic sequence respectively during a predeterminable current flow angle synchronously to the angular position of the rotor. The angular position is thereby ascertained by determining the electromotive forces which are induced in the winding coils and which depend on the angular position of the rotor and by detecting the zero crossings of the electromotive forces. The determination of the electromotive forces is thereby accomplished by measuring the coil voltages present at the winding coils. Thereby, it is a detriment that the electromotive forces can be ascertained only at certain time intervals during which the respective winding coils do not carry a current. Thus, the zero crossings of an electromotive force can be determined only when these forces are present in time ranges in which the respective winding coil is not energized. Thereby, the control range of the current flow angle is substantially limited.

It is further known from EP 647,014 B1 that the angular position of the rotor can also be ascertained with special position sensors, particularly with Hall effect sensors. The position sensors and the effort and expense for the mechanical mounting of these sensors, however, represent a substantial cost disadvantage.

SUMMARY OF THE INVENTION

Thus, it is an object of the invention to provide an angular rotor position measuring method which will yield precise results even for large current flow angles in an electronically communicated electric motor.

According to the invention the angular position of the rotor in an electronically commutated motor is ascertained at high r.p.m.s in a two-stage method. Thereby, in a first stage which is a calibration phase, a reference voltage is produced at a determined motor r.p.m. which is the calibration r.p.m. The reference voltage is adjusted so that at a point of time at which the rotor passes through a determined detection position, the reference voltage corresponds to an electromotive force which is induced in one of the winding coils of the motor. The detection position thereby is a special angular position of the rotor at which, for the entire control range of the current flow angle, the electromotive force induced in the one winding coil is present at this winding coil as a coil voltage. Thus, this coil voltage is ascertainable by a voltage measurement. In a second stage which is the actual measuring phase, first the instantaneous motor r.p.m. is ascertained. The ascertaining of the motor r.p.m. thereby takes place by an ascertaining of the frequency of one coil voltage of the coil voltages present at the winding coils of the motor. Thereafter, the reference voltage is updated to a value which is equal to the product of its voltage value adjusted in the calibration phase and the ratio of the instantaneous motor r.p.m. to the calibration r.p.m. Next, the angular position of the rotor is ascertained at which the electromotive force induced in the one winding coil is equal to the updated reference voltage. This angular position is identified as the detection position.

In an advantageous embodiment of the method the calibration r.p.m. and thus the current flow angle is selected sufficiently small for detecting zero crossings of the electromotive force induced in this winding coil by evaluating the coil voltage present at the respective winding coil. These zero crossings are then detected during the calibration phase and based on the position of the zero crossings, those points of time are ascertained at which the rotor runs through the detection position.

The calibration phase is preferably cyclically repeated. Thereby, the reference voltage is adapted to the temperature dependent changes of the electromotive forces.

The method according to the invention has a cost advantage compared to a method in which the angular position of the rotor is ascertained with special position sensors because, according to the invention, these sensors are not necessary and thus any work effort for mounting and for precisely positioning such sensors is obviated. Additionally, the present method provides precise results because no mechanical tolerances which are unavoidable in connection with using position sensors, enter into the evaluation.

The method according to the invention is very well suited for controlling of four coil brushless motors which are, for example used in motor vehicles for driving cooling fans.

BRIEF DESCRIPTION OF THE DRAWINGS

The invention will be explained more closely in the following with reference to an example embodiment and with reference to the figures. These Figs. show.

DETAILED DESCRIPTION OF A PREFERRED EXAMPLE EMBODIMENT AND OF THE BEST MODE OF THE INVENTION

Figure 1:
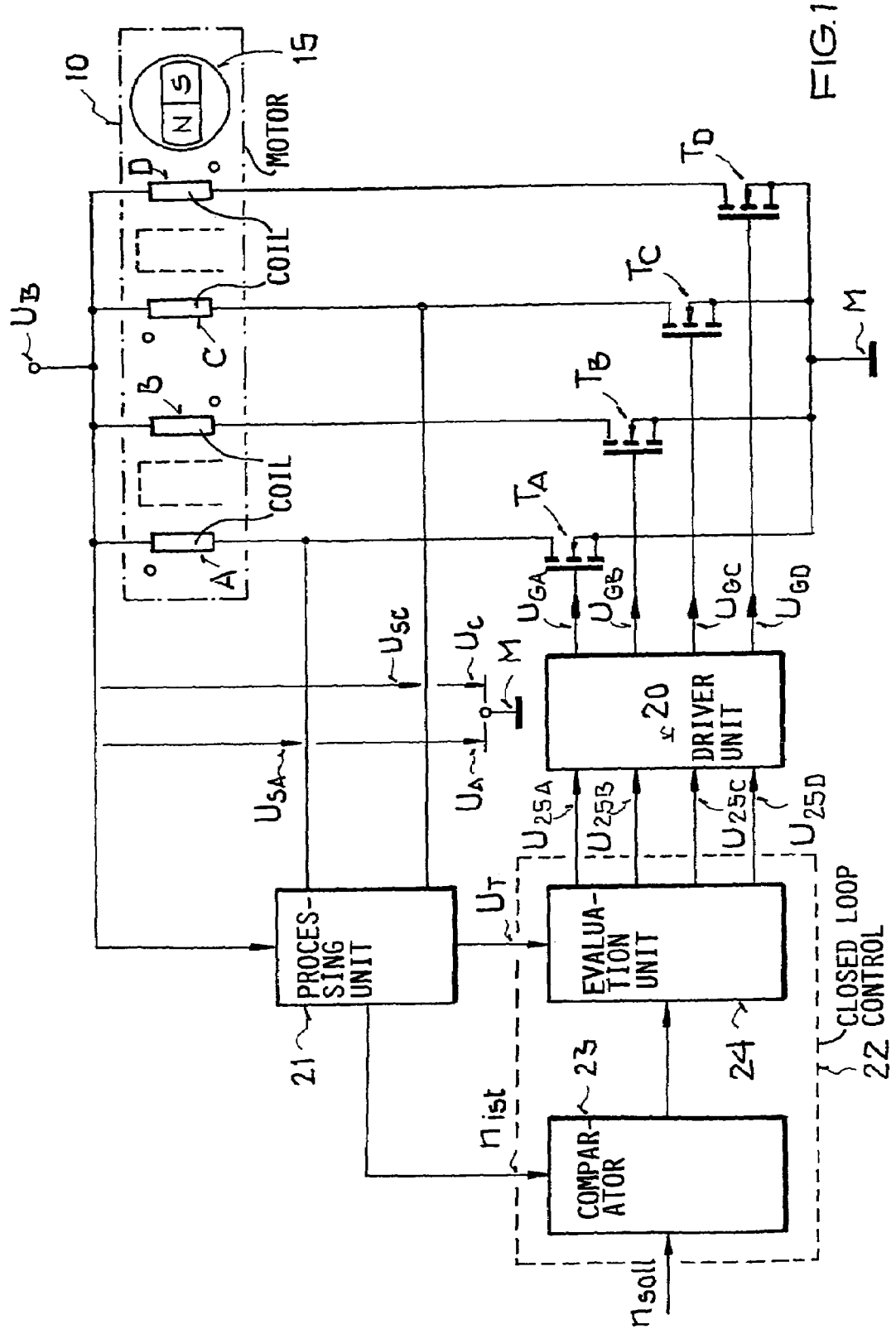
FIG. 1 a block circuit diagram with an electronically commutated motor and a control device for this motor.

FIG. 1 shows, as an example embodiment, a block circuit diagram of an electronically commutated motor 10 and a block circuit diagram of a control device for regulating (controlling in closed loop fashion) the r.p.m. of the motor 10.

The motor 10 comprises a permanent magnetic rotor 15 and a stator with four winding coils A, B, C and D. Two each of these winding coils are combined to a coil pair A, B or C, D, whereby the coil pairs A, B or C, D are wound on a respective tooth. The winding coils A, B or C, D of the respective coil pair are wound in bifilar parallel fashion and produce, when energized, magnetic fields of opposing polarity. The motor 10 is energized out of a DC voltage source, for example out of a vehicle battery. The winding coils A, B, C, D are connected for this purpose with one terminal to a common circuit node. A battery voltage $U_B$ provided by a DC voltage source is connected to this circuit node. The opposite terminal ends of the winding coils are connected through a control transistor, for example a field effect transistor $T_A$ or $T_B$ or $T_C$ or $T_D$ with a ground terminal M.

The winding coils A, B, C, D are energized in a cyclic sequence respectively during a predeterminable electrical current flow angle α through the control transistors $T_A$, $T_B$, $T_C$ and $T_D$. A control device 20, 21, 22 generates control impulses for the sequentially correct controlling of the control transistors $T_A$, $T_B$, $T_C$ and $T_D$. The control signals are supplied to the control inputs of the control transistors $T_A$, $T_B$, $T_C$ and $T_D$ as control signals $U_{GA}$, $U_{GB}$, $U_{GC}$, $U_{GD}$.

The control device comprises a processing stage 21 which ascertains the instantaneous running motor r.p.m. $n_{ist}$ based on the coil voltages $U_{SA}$ and $U_{SC}$ of the winding coil A and the winding coil C. The control device generates a trigger signal $U_T$ which marks the point of time at which the rotor 15 passes through a determined angular position ϕ. The control device further comprises a driver unit 20 for producing the control signals $U_{GA}$, $U_{GB}$, $U_{GC}$ and $U_{GD}$. The control device further includes a closed loop control stage 22 for triggering the driver unit 20. The closed loop control stage 22 comprises in its turn a comparator 23 which compares, while the motor is running, an instantaneous running motor r.p.m. $n_{ist}$ with a predetermined rated r.p.m. $n_{soll}$. The closed loon control stage 22 further includes an evaluating unit 24 which produces, based on the r.p.m. comparing result and on the trigger signal $U_T$, correctly timed signals $U_{25A}$, $U_{25B}$, $U_{25C}$ and $U_{25D}$ for the driver unit 20. The closed loop control stage 22 may further comprise means for ascertaining the current flowing through the winding coils A, B, C and D and means for passing on the current information to the evaluating unit 24. The current may, for example, be ascertained with a shunt resistor provided in the grounding circuit branch of the control transistors $T_A$, $T_B$, $T_C$ and $T_B$.

Figure 2:
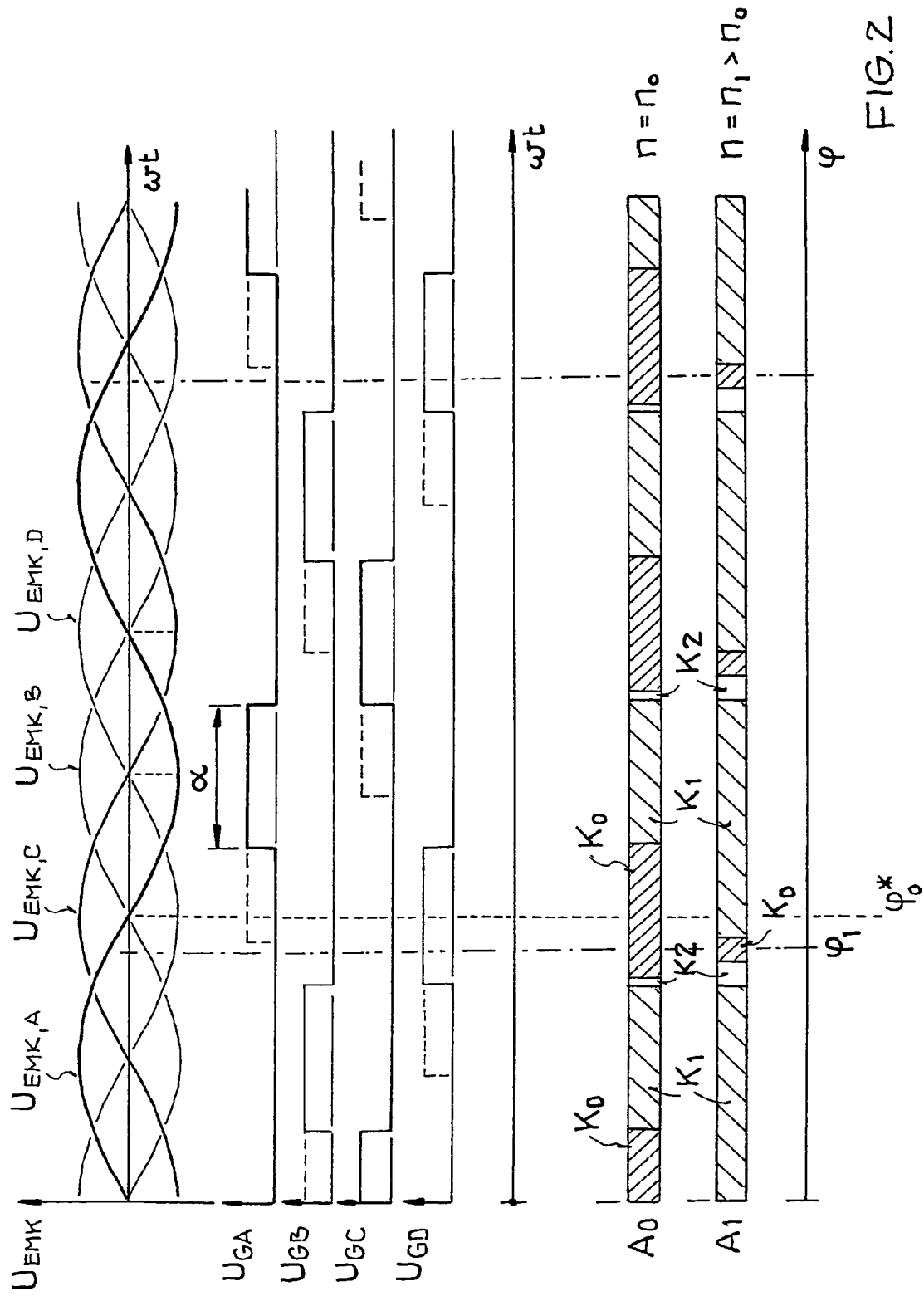
FIG. 2 is a schematic illustration of signals for explaining the commutating procedure.

The commutating of the motor 10 can be explained with reference to FIG. 2. FIG. 2 shows the signals as a function of the angular position ϕ=ωt of the rotor 15. The upper diagram shows the electromotive forces $U_{EMK,A}$, $U_{EMK,B}$, $U_{EMK,C}$, $U_{EMK,D}$ induced in the winding coils A, B, C and D. Therebelow are shown the control signals $U_{GA}$, $U_{GB}$, $U_{GC}$ and $U_{GD}$ which are supplied to the control transistors $T_A$, $T_B$, $T_C$ and $T_D$. The pulse widths of these control signals $U_{GA}$, $U_{GB}$, $U_{GC}$ and $U_{GD}$ correspond to the current flow angle α of the respective control transistor $T_A$, $T_B$, $T_C$ and $T_D$. The pulse widths determine the motor r.p.m. n of the motor 10. The motor r.p.m. n may be increased from a low r.p.m. $n_0$ to a high r.p.m. $n_1$ by increasing the current flow angle α in the manner shown by dashed lines. Below the control signals $U_{GA}$, $U_{GB}$, $U_{GC}$ and $U_{GD}$ there are shown working sections $A_0$, $A_1$ of the coil pair A, B at a low r.p.m. n=$n_0$ or at a high r.p.m. n=$n_1$. The working sections $A_0$, $A_1$ include different angular sectors $K_0$, $K_1$, $K_2$. Within the angular sections $K_0$ the winding coil A as well as the winding coil B wound onto the same tooth are switched off. In the angular sections $K_1$ either the transistor $T_A$ or the transistor $T_B$ is switched into the conducting state for energizing the winding coil A or the winding coil B. The angular sections $K_2$ represent areas in which, following switching off the transistors $T_A$ or $T_B$, the winding coil A or the winding coil B is decommutated.

The electromotive forces $U_{EMK,A}$ or $U_{EMK,B}$ or $U_{EMK,C}$ or $U_{EMK,D}$ induced in the winding coils A, B, C and D, exhibit respectively a characteristic curve that is determined by the angular position ϕ. These electromotive forces are present at the respective winding coil as coil voltages and can be measured in these angular sections by a simple voltage measurement. The angular sections relate to the respective winding coil and the winding coil wound onto the same tooth which are not switched on during these angular sections. For example, the electromotive force $U_{EMK,A}$ induced in the winding coil A is present as a coil voltage $U_{SA}$ at the winding coil A when no current is flowing through the winding coil A nor through the winding coil B, thus, in the angular sections $K_0$. This angular section $K_0$ is large for a small current flow angle α and thus at a small r.p.m. $n_0$. This angular section $K_0$ embraces a range of the electromotive force $U_{EMK,A}$ in which this electromotive force exhibits a zero crossing $ϕ_0^*$. This zero crossing neither depends on the r.p.m. nor on the temperature. Compared thereto the angular section $K_0$ at the high r.p.m. $n_1$ is very small and then embraces a range of the electromotive force $U_{EMK,A}$ in which this force does not exhibit a zero crossing. In this range the electromotive force $U_{EMK,A}$ depends on the r.p.m. and on the temperature.

In order to also make possible a precise ascertaining of the angular position α of the rotor 15 at high motor r.p.m.s at which the zero crossings of the electromotive forces are not visible as coil voltages, a calibration of the control device is first performed.

Figure 3:
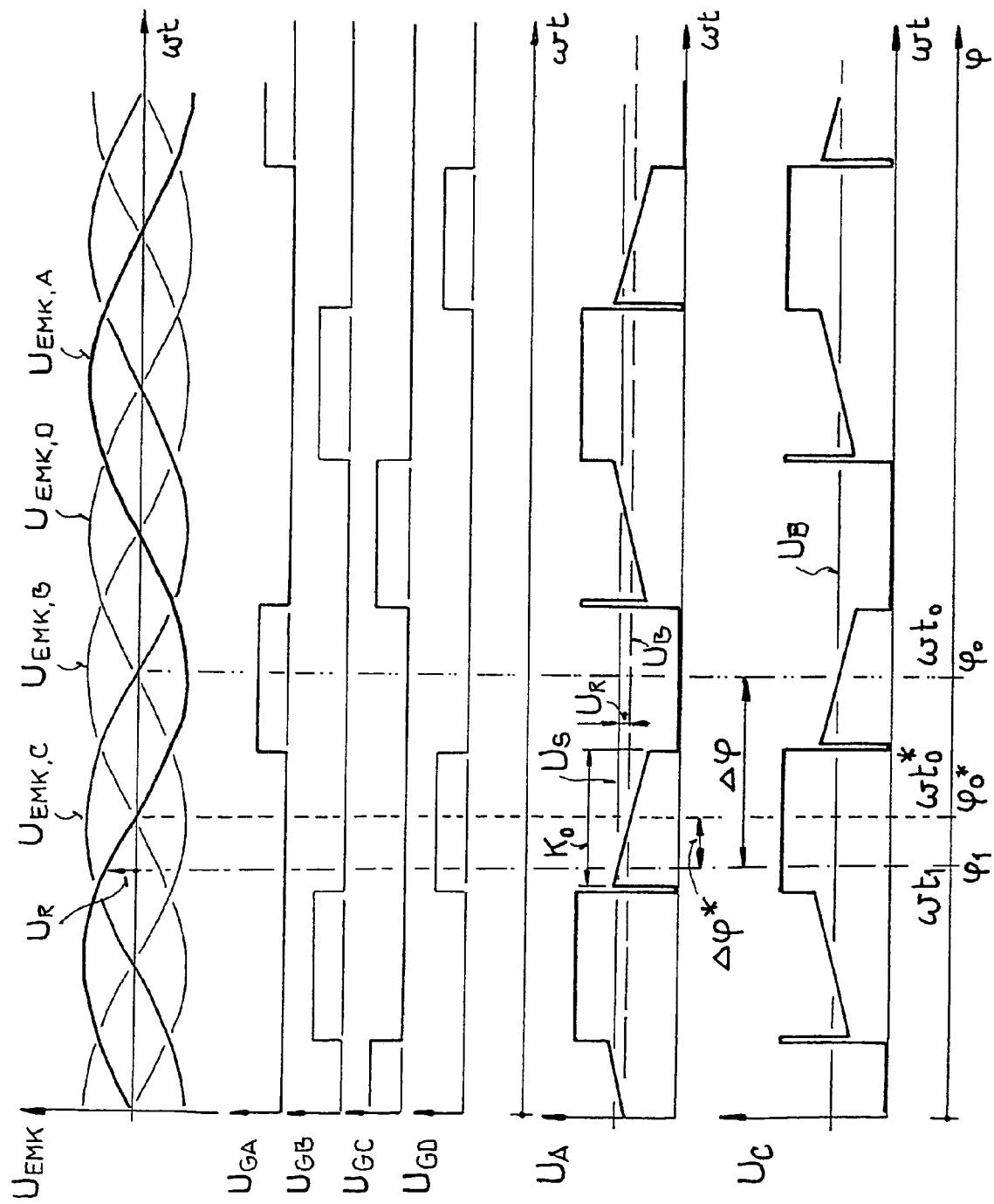
FIG. 3 is a schematic illustration of signals during a calibration phase.

The calibration procedure is best described with reference to FIG. 3. In this Fig. the signals are also shown as a function of the angular position ϕ=ωt of the rotor 15. The upper diagram shows the electromotive forces $U_{EMK,A}$, $U_{EMK,B}$, $U_{EMK,C}$ and $U_{EMK,D}$ induced in the winding coils A, B, C and D. The control signals $U_{GA}$, $U_{GB}$, $U_{GC}$ and $U_{GD}$ supplied to the control transistors $T_A$, $T_B$, $T_C$ and $T_D$ are shown therebelow. The measured voltages $U_A$ and $U_C$ are shown below the control signals. The measured voltages are present at the connecting point of the winding coil A with the control transistor $T_A$ or respectively at the connecting point of the winding coil C with the control transistor $T_C$.

The angular position $ω_0$ corresponds to the zero crossing of the electromotive force $U_{EMK,C}$ and the angular position $ϕ_0^*$ corresponds to the zero crossing of the electromotive force $U_{EMK,A}$. The angular position $ϕ_1$ is referred to in the following as the detection position. The detection position is selected in such a way that even at a maximum current flow angle α the detection position lies in an angular range in which the electromotive force $U_{EMK,A}$ is present as a coil voltage $U_{SA}$ of the winding coil A. The detection position $ϕ_1$, is spaced by a fixed, predetermined angular value Δϕ or Δϕ* relative to the zero crossing $ϕ_0$ or $ϕ_0^*$ of the electromotive force $U_{EMK,C}$ or $U_{EMK,A}$.

In the calibration phase the instantaneous, running motor r.p.m. $n_{ist}$ is adjusted by controlling the current flow angle α, to a calibration r.p.m. $n_K$ which is selected to be so small that the electromotive force $U_{EMK,C}$ induced in the winding coil C is in the angular range in which it is present as coil voltage $U_{SC}$ at the winding coil C and exhibits a zero crossing $ϕ_0$. The maintaining of the calibration r.p.m. $n_K$ can thereby be checked by a frequency analysis of the measured voltage $U_A$ or $U_C$.

Thereafter, the zero crossing $ϕ_0$ is ascertained at a constant calibration r.p.m. $n_K$. For this purpose the angular range is first ascertained in which the electromotive force $U_{EMK,C}$ is present at the winding coil C as the coil voltage $U_{SC}$. In this angular range the measured voltage $U_C$ is compared with the battery voltage $U_B$ and the angular position ϕ is identified as the zero crossing $ϕ_0$ when the measured voltage $U_C$ is equal to the battery voltage $U_B$. Alternatively, the zero crossing $ϕ_0^*$ of the electromotive force $U_{EMK,A}$ can be detected by comparing the measured voltage $U_A$ with the battery voltage $U_B$. Then a threshold voltage $U_S$ which equals the sum of the battery voltage $U_B$ and a reference voltage $U_R$ is compared with the measured voltage $U_A$. The threshold voltage $U_S$ is controlled in closed loop fashion by varying the reference voltage $U_R$ in such a way that the threshold voltage $U_S$ and the measured voltage $U_A$ intersect each other at the detection position $\phi_1$ which is spaced from the zero crossing $\phi_0$ by the known angular value $\Delta\phi$ or which is spaced from the zero crossing $\phi_0^*$ by the known angular value $\Delta\phi^*$. By this measure the reference voltage $U_R$ is adjusted to a voltage value which is assumed by the electromotive force $U_{EMK,A}$ when the rotor 15 passes through the detection position $\phi_1$. This value is stored in an intermediate storage as the calibration value $U_{kal}$.

Figure 4:
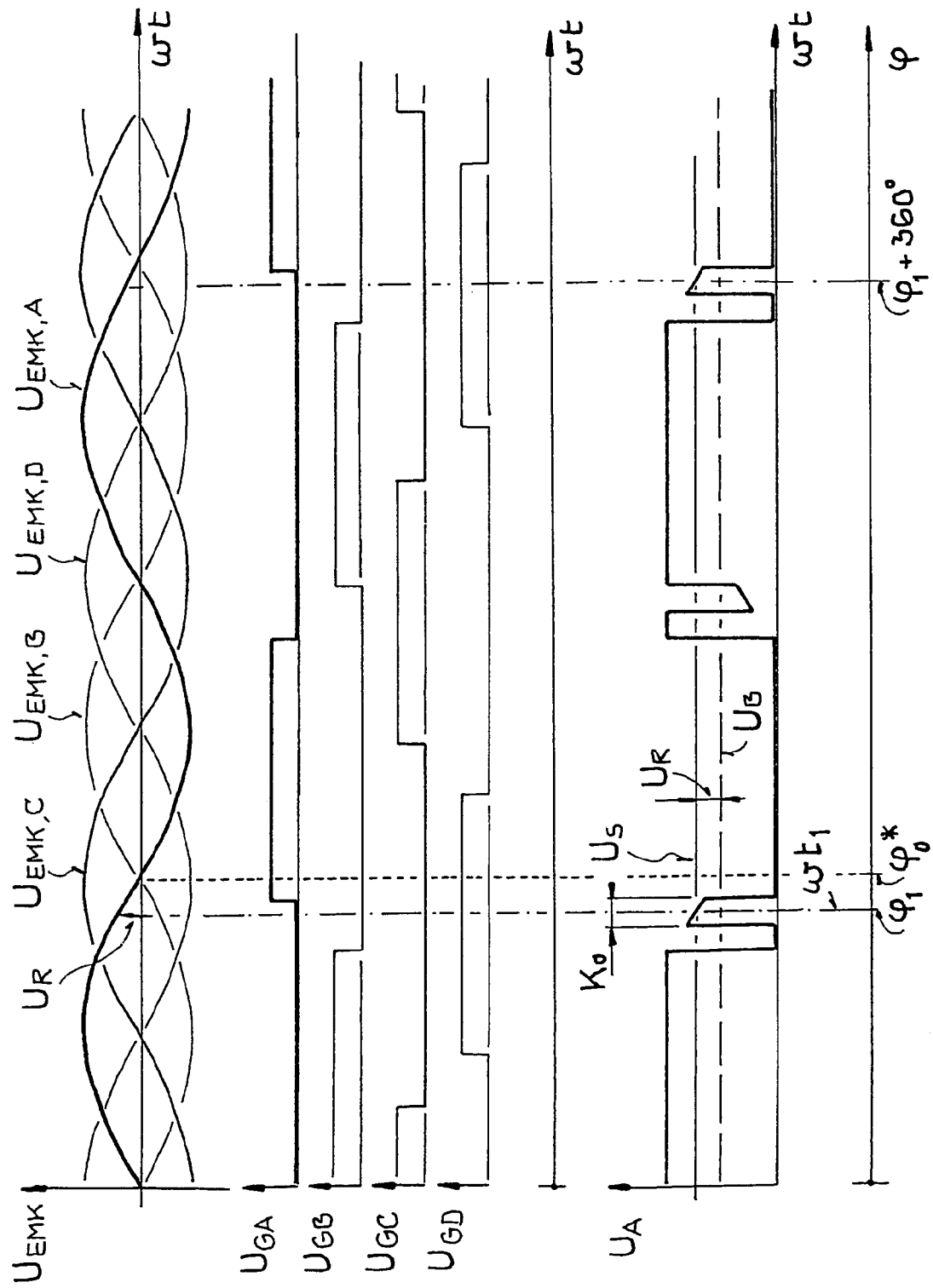
FIG. 4 is a schematic illustration of signals during a measuring phase.

The actual measuring takes place in a following measuring phase which will be described in more detail with reference to FIG. 4. In this Fig. the signals are also shown as a function of the angular position $\phi = \omega t$ of the rotor 15. The upper diagram shows, as in FIG. 3, the electromotive forces $U_{EMK,A}$, $U_{EMK,B}$, $U_{EMK,C}$ and $U_{EMK,D}$ induced in the winding coils A, B, C and D. Thereunder the control signals $U_{GA}$, $U_{GB}$, $U_{GC}$, $U_{GD}$ and the measured voltage $U_A$ are shown which are supplied to the control transistors $T_A$, $T_B$, $T_C$ and $T_D$. Thereby, the signals for a current flow angle $\alpha$ are shown. The current flow angle is selected so large that the zero crossing $\phi_0^*$ of the electromotive force $U_{EMK,A}$ is no longer visible as a coil voltage $U_{SA}$.

During the measuring phase the instantaneous motor r.p.m. $n_{ist}$ is first ascertained. Thereafter, the reference voltage $U_R$ is updated to the value $U_{Rakt}$, whereby the actualization takes place according to the equation $$U_{Rakt} = U_{kal} \cdot (n_{ist}/n_K)$$

In the equation $U_{kal}$ is the voltage value of the reference voltage $U_R$ adjusted in the calibration phase, $n_{ist}$ is the instantaneous motor r.p.m. and $n_{kal}$ is the calibration r.p.m. By the actualization of the reference voltage $U_R$ the threshold voltage $U_S$ is also updated to an r.p.m. dependent value, namely the value $$U_S = U_B + U_{kal} \cdot (n_{ist}/n_K)$$

Thereafter the angular position $\phi$ is ascertained in the angular range $K_0$ in which the electromotive force $U_{EMK,A}$ is present as a coil voltage $U_{SA}$ at the winding coil A. At the angular position $\phi$ the measured voltage $U_A$ is equal to the updated threshold voltage $U_S$. This corresponds to the ascertaining of the angular position $\phi$ at which the electromotive force $U_{EMK,A}$ is equal to the updated value $U_{Rakt}$ of the reference voltage $U_R$. This angular position $\phi$ then is identified as the detection position $\phi_1$.

In this manner it is possible to ascertain the angular position $\phi$ of the rotor 15 with a high accuracy even for large current flow angles $\alpha$ at which the zero crossings of the electromotive forces are no longer visible at the winding coils of the motor.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

The invention claimed is:

1. A method for determining the angular position ($\phi$) of a rotor (15) of an electronically commutated motor (10) having a plurality of winding coils (A, B, C, D) wherein said winding coils (A, B, C, D) are respectively energized in a cyclic sequence during a predeterminable current flow angle ($\alpha$), to provide a closed loop motor control signal said method comprising the following steps:
  a) selecting an angular detection position ($\phi_1$) out of angular rotor positions ($\phi$), wherein said angular detection position ($\phi_1$) is defined by an electromotive force ($U_{EMK,A}$) induced in one of said winding coils (A) during an entire dynamic range of said current flow angle ($\alpha$), said electromotive force ($U_{EMK,A}$) being present as a coil voltage ($U_{SA}$),
  b) performing a calibration phase while said electronically commutated motor (10) is running, by adjusting an instantaneous running motor r.p.m. ($n_{ist}$) to a calibration r.p.m. ($n_K$) and by adjusting a reference voltage ($U_R$) to a calibration voltage ($U_{kal}$) that is equal to said electromotive force ($U_{EMK,A}$) induced in said one winding coil (A) when said running rotor passes through said angular detection position ($\phi_1$), and
  c) performing a measuring phase by ascertaining said instantaneous, running motor r.p.m. ($n_{ist}$), by updating said reference voltage ($U_R$) to an updated reference voltage value ($U_{Rakt}$) equal to the product of said calibration voltage ($U_{kal}$) times a ratio between said instantaneous running motor r.p.m. ($n_{ist}$) and said calibration r.p.m. ($n_k$) thus:

$$U_{Rakt} = U_{kal} \cdot (n_{ist}/n_K),$$

and identifying said angular detection position ($\phi_1$) as a position of said rotor (15) at which said electromotive force ($U_{EMK,A}$) induced in said one winding coil (A) is equal to said updated reference voltage value ($U_{Rakt}$).

2. The method of claim 1, comprising the further step:
  d) selecting said calibration r.p.m. ($n_K$) sufficiently low that zero crossings ($\phi_0^*$, $\phi_0$) of said induced electromotive force ($U_{EMK,A}$; $U_{EMK,C}$) become detectable, detecting said zero crossings ($\phi_0^*$, $\phi_0$) during said calibration phase, and ascertaining, in response to said zero crossings ($\phi_0^*$, $\phi_0$), points of time at which said rotor passes through said angular detection position ($\phi_1$).

3. The method of claim 1, further comprising ascertaining said instantaneous running motor r.p.m. ($n_{ist}$) by measuring a frequency of said coil voltage present at any one of said winding coils (A, B, C, D).

4. The method of claim 1, further comprising repeating said calibration phase while said electronically commutated motor (10) is running.

5. The method of claim 1, further comprising evaluating said coil voltage ($U_{SA}$) of a respective winding coil during a time interval when one or more winding coils wound onto the same tooth is or are switched off for ascertaining said electromotive force ($U_{EMK,A}$) as a respective electromotive force of a corresponding winding coil.

* * * * *